(12) United States Patent
Cole

(10) Patent No.: US 6,956,481 B1
(45) Date of Patent: Oct. 18, 2005

(54) METAL SCREENED ELECTRONIC LABELLING SYSTEM

(75) Inventor: Peter Cole, West Lakes Shore (AU)

(73) Assignee: Germplus, Gemenos (FR)

( * ) Notice: Subject to any disclaimer, the term of this patent is extended or adjusted under 35 U.S.C. 154(b) by 0 days.

(21) Appl. No.: 09/744,145

(22) PCT Filed: Jul. 20, 1999

(86) PCT No.: PCT/AU99/00587

§ 371 (c)(1),
(2), (4) Date: Jan. 30, 2001

(87) PCT Pub. No.: WO00/05675

PCT Pub. Date: Feb. 3, 2000

(30) Foreign Application Priority Data

Jul. 20, 1998 (AU) .................................. PP4738

(51) Int. Cl.[7] .............................................. G08B 13/14
(52) U.S. Cl. ................... 340/572.4; 340/572.7
(58) Field of Search .................. 340/572.1, 572.4, 340/572.5, 572.6, 572.7, 551, 10.34; 235/375, 235/376, 435, 492, 493

(56) References Cited

U.S. PATENT DOCUMENTS

| 4,622,543 | A | * | 11/1986 | Anderson et al. | 340/572.1 |
| 4,647,917 | A | * | 3/1987 | Anderson et al. | 340/572.4 |
| 5,523,749 | A | * | 6/1996 | Cole et al. | 340/10.34 |
| 5,565,847 | A | | 10/1996 | Gambino et al. | 340/572.6 |
| 5,587,578 | A | * | 12/1996 | Serra | 235/492 |
| 5,736,929 | A | | 4/1998 | Schrott et al. | 235/492 |
| 5,793,305 | A | * | 8/1998 | Turner et al. | 340/10.34 |
| 6,172,608 | B1 | * | 1/2001 | Cole | 340/572.1 |

FOREIGN PATENT DOCUMENTS

| EP | 0285188 | 10/1988 |
| GB | 2258712 | 10/1995 |
| JP | 9-331279 | 12/1997 |

* cited by examiner

Primary Examiner—Van T. Trieu
(74) Attorney, Agent, or Firm—Roland Plottel

(57) ABSTRACT

A metal screened (13) electronic labelling system having at least one information bearing electronic coded label including a label coil (12) and an interrogator including a transmitter coil (9). The system relies on a magnetic field coupling link containing the transmitter coil (9) and the label coil (12) for obtaining information from the label. The coupling link is arranged such that it operates in the near field thereof and substantially none or at most a minority of the magnetic flux which excites the label coil (12) also links the transmitter coil (9).

39 Claims, 10 Drawing Sheets

METAL SCREENED ELECTRONIC LABELLING SYSTEM

CROSS REFERENCE TO RELATED APPLICATIONS

The present application is the national stage under 35 U.S.C. 371 of PCT/AU99/00587, filed Jul. 20, 1999.

BACKGROUND OF THE INVENTION

The present invention relates to a system for remote identification of or telemetry to or from objects using electronically interrogatable coded labels. In particular the invention may relate to a system for automated identification of articles in a warehouse or in a cargo shipping system wherein an electronic sub system called an interrogator including a transmitter and receiver extracts by electromagnetic means useful information from an electronically coded label attached to such articles or a carrier of such articles as they or it is processed through sorting operations or those items are stacked inventoried or collected within a warehouse or are moved within a transportation system. Although the present invention is first herein described with reference to an airline shipping operation, it is to be appreciated that it is not thereby limited to such an application. Thus the identification or telemetry system of the present invention may be applied to object identification operations generally. As an example, the invention may be applied in the oil drilling industry in the labelling and identification in use of the separate components which make up what is termed a drill string.

BRIEF SUMMARY OF THE INVENTION

According to one aspect of the present invention there is provided an electronic label reading system including:
  at least one information bearing electronic coded label;
  an interrogator including a transmitter coil and a receiver coil;
  a magnetic field coupling link containing said transmitter coil and said receiver coil for obtaining information from said label;
  wherein the coupling link is arranged such that it operates in the near field thereof and wherein substantially none or at most a minority of the magnetic flux which excites said receiver coil also links said transmitter coil.

According to a further aspect of the present invention there is provided an electronic coded label for use in proximity to a metal object wherein said label is carried in a slot in said metal object.

According to a still further aspect of the present invention there is provided a method of obtaining information from an electronic label in proximity to a metal object, said method including the steps of:
  providing an interrogator containing a transmitter coil and a receiver coil;
  providing a magnetic field coupling link containing said transmitter coil and said receiver coil for obtaining information from said label; and
  arranging said coupling link such that it operates in the near field thereof and wherein substantially none or at most a minority of the magnetic flux which excites said receiver coil also links said transmitter coil.

BRIEF DESCRIPTION OF THE SEVERAL VIEWS OF THE DRAWINGS

A preferred embodiment of the present invention will now be described with reference to the accompanying drawings wherein.

DETAILED DESCRIPTION OF THE INVENTION

Figure 1:
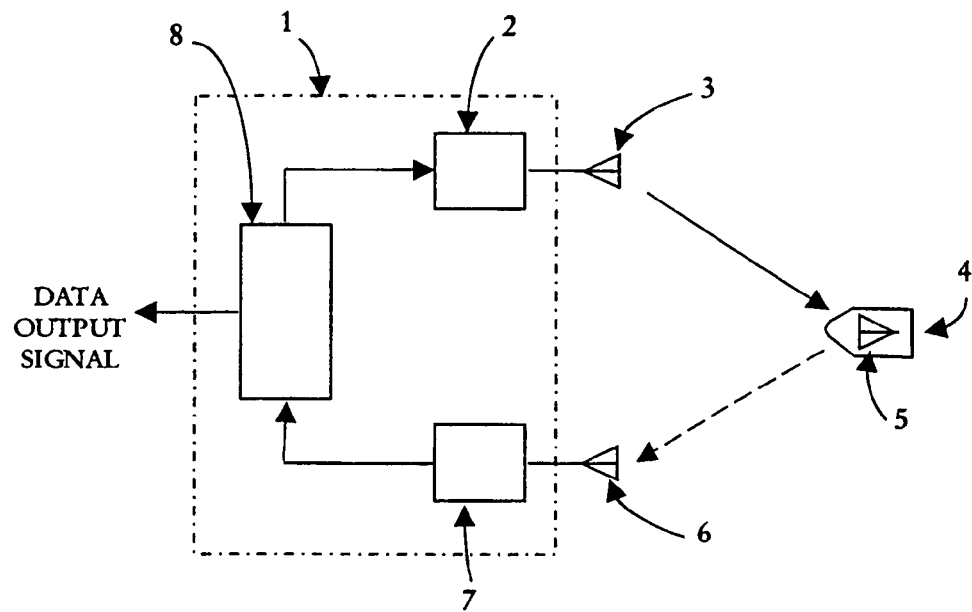
FIG. 1 shows a simplified diagram of a system to which the present invention relates.

A simplified diagram of the type of system to which the invention relates is shown in FIG. 1. The system uses the principle of electromagnetic communication in which an interrogator 1 containing a transmitter 2 generates an electromagnetic signal which is transmitted via a transmitter antenna 3 to an electronic label 4 containing a label receiving antenna 5. The label receiving antenna 5 may receive a proportion of the transmitted signal and through a rectifier may generate a dc power supply which may be used for operation of a reply generation circuit connected to either the label receiving antenna or to a separate label reply antenna, with the result that an information bearing electromagnetic reply signal is transmitted from the label 4 back to a receiver antenna 6 and then to a receiver 7 in the interrogator 1. Within the interrogator 1 is a controller and decoder 8 which further processes signals from the receiver 7 and produces a data output signal which is useful in automated handling of the articles to which the labels are attached.

The interrogator may communicate signals to the label 4 as well as extract signals from the label 4, and can use any of the principles outlined in PCT/AU/90/00043, PCT/AU92/00143 and PCT/AU92/00477 the disclosures of which are incorporated herein by cross reference. Quite often a single antenna in the interrogator provides the functions of both the transmitter antenna 3 and receiver antenna 6. Similarly a single antenna within the label can perform the functions of a label receiving antenna 5 and a label reply antenna.

Figure 2:
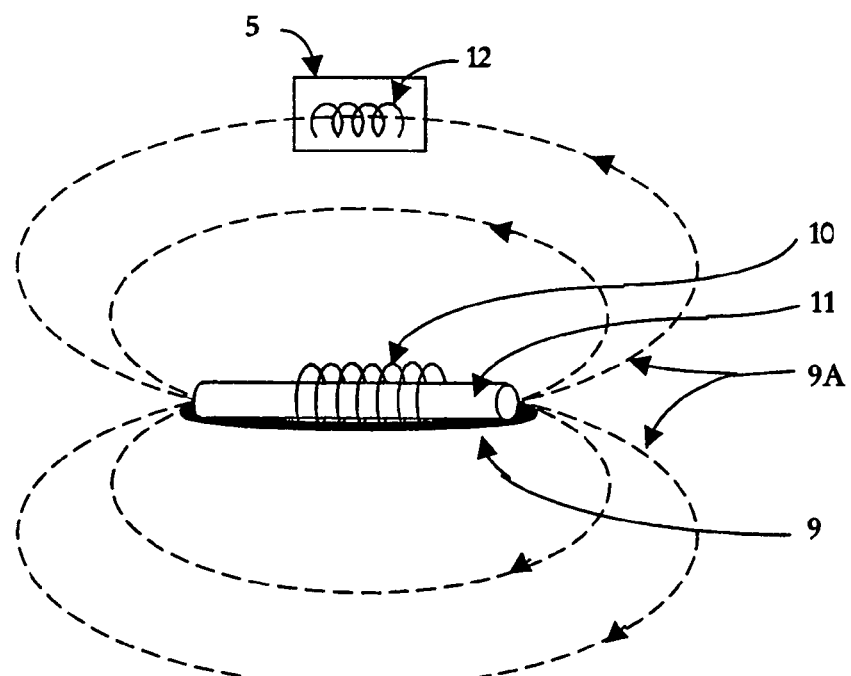
FIG. 2 shows interaction between an interrogator antenna and a label receiving antenna.

In the usual design of such systems, the label receiving antenna 5 and interrogator antenna 9 are placed in reasonable proximity, as shown in FIG. 2, with no intervening objects, particularly metallic ones. In such systems, as shown in FIG. 2, an interrogator antenna 9 which may be in the form of a solenoid 10 with a ferromagnetic rod 11 creates a magnetic field 11A and associated magnetic flux, a portion of which links a label antenna coil 12 to create communication with and possibly excitation of label receiving antenna 5.

Very often however circumstances influence the placement of the label receiving antenna 5 to be on one side of a metallic object 13 while the interrogator antenna 9 is on the other. A good example of this situation is provided by the requirement for labelling and airline shipping pallet 14 shown in FIG. 3.

Figure 3:
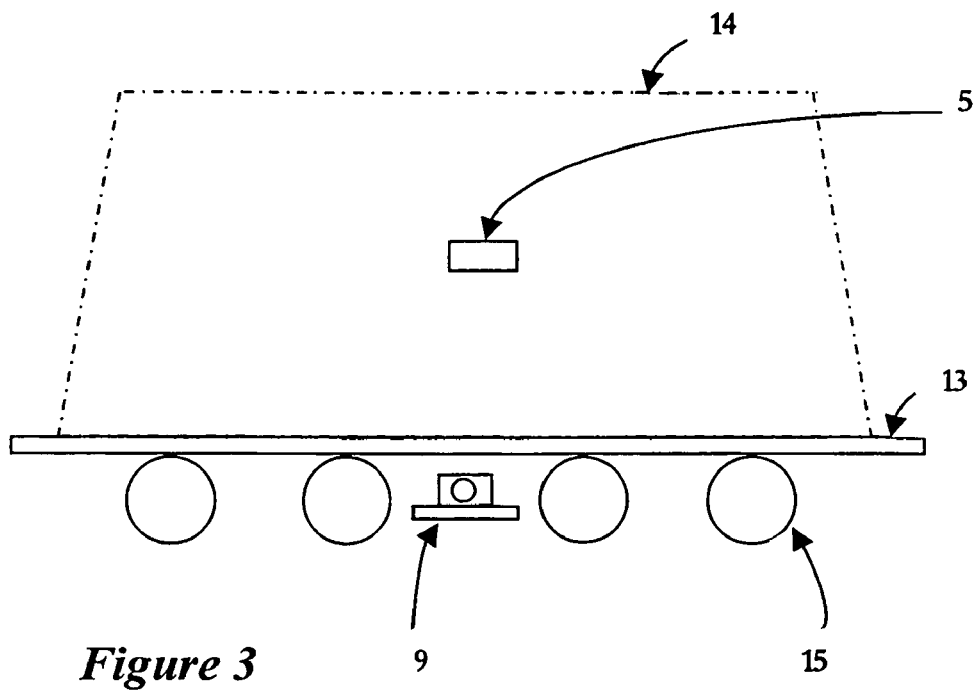
FIG. 3 shows an interrogator antenna and a label receiving antenna in the presence of a metal plate.

As shown in FIG. 3, such a pallet 14 has a flat underside in the form of a metallic plate 13. In handling in a warehouse the pallet 14 is moved on a set of rollers 15, and in an aircraft hold it is bolted to the floor. No apparatus, particularly an electronic label 4, may be placed either below or within that metallic plate 13. On the other hand, for reasons of protection, the interrogator antenna 9 is constrained to lie between the rollers 15 of the conveyor mechanism. The result is that in this application the interrogator antenna 9 and the label receiving antenna 5 are separated by a metallic plate 13 of substantial extent. It is an object of this invention to design an electronic labelling system which can perform satisfactorily subject to this constraint.

As illustrated in FIG. 3, there are circumstances when placement of the label receiving antenna 5 and placement of the interrogator antenna 9 are such that there is substantial screening of the label 4 by surfaces of metallic plate 13 from the interrogator antenna 9 and from the field created by the interrogator antenna 9.

The present invention may create an interrogation field for a label by creating current flowing on the metallic surface 13 of the object to be labelled. The metal surfaces in which current flow which produces the magnetic field and which excites the label, may be on the opposite surface to the one adjacent to the interrogator antenna.

So that the principles of the invention may be better appreciated, it is appropriate to review here some of the fundamental of laws of electrodynamic theory. In this exposition, and in the argument to be provided in this disclosure, the terminology and units used will be as defined in the international standard ISO 1000 (1992) "SI units and recommendations for the use of their multiples and of certain other units".

A good starting point for such an exposition is to mention the conservation law of electric charge which states that a net inflow of current into a region produces a corresponding rate of change with respect to time of the total electric charge within that region. This law is consistent with and indeed is required by the four basic laws of electrodynamics which are stated below.

In the usual notation, the vector E represents the electric field intensity measured in V/m and the vector H represents the magnetic field intensity measured in A/m. Two additional vectors P representing the polarisation of a dielectric medium and M representing the magnetisation of a magnetic medium allow the definition of an electric flux density vector $D=e_oE+P$ measured in $C/m^2$, and a magnetic flux density vector $B=m_o(H+M)$ measured in $Wb/m^2$. In the below statements, the term circulation refers to the integral with respect to distance around a stated closed path of the scalar product between a named field vector and a vector element of distance around that path, while the term flux refers to the integral with respect to area over a stated area of the scalar product between a named field vector and a vector element of that area. In terms of that terminology and the four vectors E, H, D and B the four fundamental laws are:

(1) Faraday's law: The circulation of the electric field vector E around a closed contour is equal to minus the time rate of change of magnetic flux through a surface bounded by that contour, the positive direction of the surface being related to the positive direction of the contour by the right hand rule.

(2) Ampere's law as modified by Maxwell: The circulation of the magnetic field vector H around a closed contour is equal to the sum of the conduction current and the displacement current passing through a surface bounded by that contour, with again the right hand rule relating the senses of the contour and the surface.

(3) Gauss' law for electric flux: The total electric flux (defined in terms of the D vector) emerging from a closed surface is equal to the total conduction charge contained within the volume bounded by that surface.

(4) Gauss' Law for magnetic flux: The total magnetic flux (defined in terms of the B vector) emerging from any closed surface is zero.

Another important principle, in fact derivable from the fundamental principles above and which underlies the material to follow, is that when electromagnetic fields are oscillating and at a sufficiently high frequency they do not penetrate to any significant distance into the interior of a sufficiently good conductor, as for example a metallic conductor. A further principle, again derivable from the fundamentals, is that the tangential component of the electric field intensity E at an metallic conductor is zero.

Yet another principle, again derivable from the fundamentals, is that the tangential component of the magnetic field vector H at a metal surface can be non-zero, but if so it is accompanied by a surface current density J equal in magnitude to the tangential component of H but orthogonal to it in direction.

Figure 4:
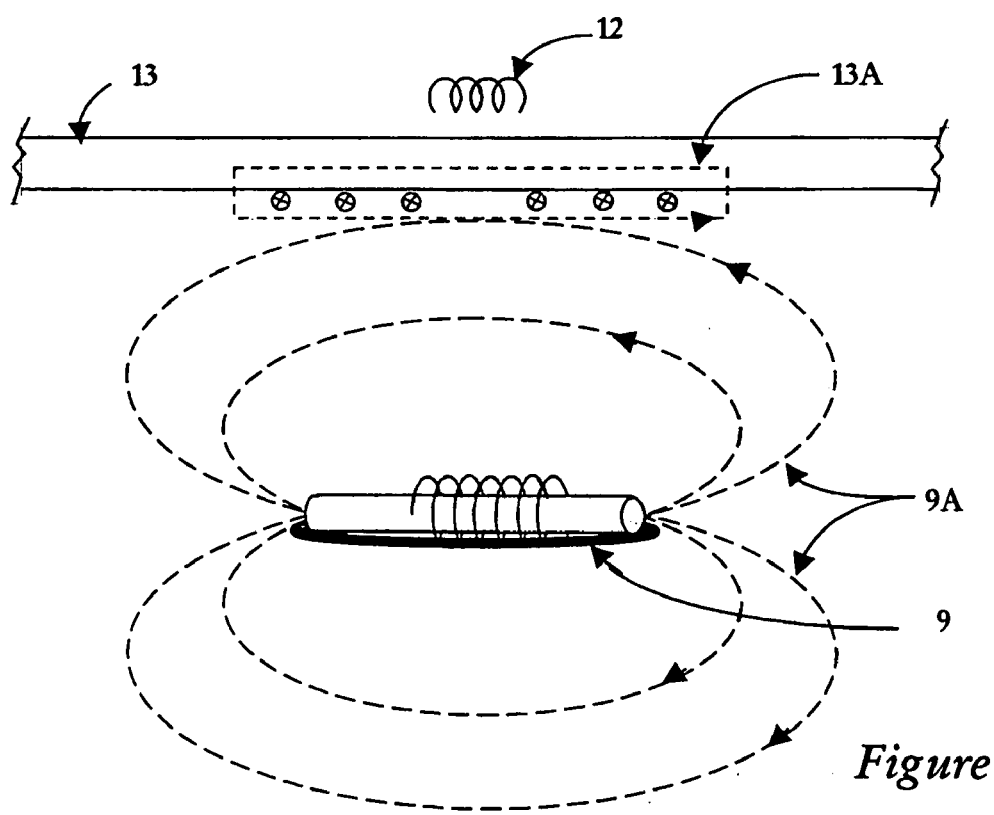
FIG. 4 shows interaction between an interrogator antenna and a label receiving antenna in the presence of a metal plate.

The interplay of these principles is illustrated in FIG. 4 which shows an interrogator antenna 9 generating an interrogator magnetic field, represented by dashed lines, beneath a metallic plate 13, on the underside of which is flowing a surface current density directed into the plane of the diagram and represented by circles containing crosses. In the light of the principles listed above it may be seen that the role of the surface current is to extinguish the magnetic field H inside the metallic plate 13 from the value that would be present at that location if the metallic plate 13 had been absent. It is notable in the diagram of FIG. 4 that the interrogator antenna 9 produces a magnetic field which is tangential to the lower side of the metallic plate 13, and surface currents flow on the metallic plate 13 in the direction into the page. The circulation of the magnetic field around the contour 13A shown as the dashed line clearly has a non-zero value because of the discontinuity between the tangential components of magnetic field inside and outside of the magnetic plate 13. In view of the principle that the tangential component of electric field and hence electric flux density will be zero at the metallic plate surface, the surface conduction current density is required to satisfy the principle which was labelled above as Ampere's Law as modified by Maxwell. The extinguishment of the magnetic field within and in the region above the metallic plate 13 will ensure that a label receiving antenna coil 12 placed above the metallic plate 13 receives no excitation.

Figure 5:
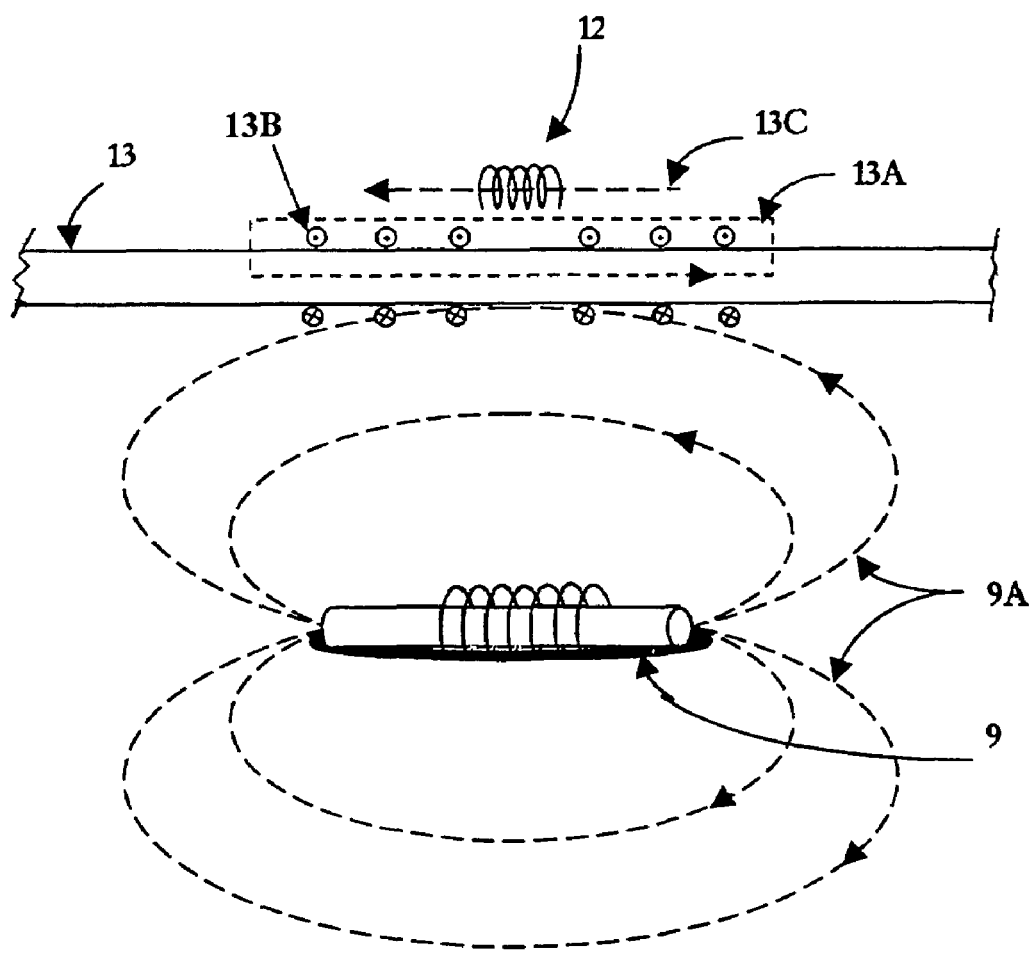
FIG. 5 is similar to FIG. 4 but shows surface current density and magnetic field.

In FIG. 5, the diagram of FIG. 4 has been modified to introduce a surface current density 13B on the upper surface of the metallic plate 13, directed out of the plane of the diagram and represented by circles containing dots, and also by moving the contour 13A shown in FIG. 4 upwards so that it now encloses those surface currents, which have by means to be discussed below been created on the top side of the metallic plate 13.

If the principle labelled above as Ampere's Law is again applied as modified by Maxwell, it may be seen that the role of the surface currents on the top side of the metallic plate 13 is to establish a magnetic field 13C in a horizontal direction just above that surface, and in a position to excite the electronic label coil 12 positioned in that region and with the orientation shown. Thus the role of that upper surface current may be seen as that of establishing that magnetic field.

For convenience in the later discussion, the term magnetic flux which excites a coil will be used to denote, in the case of a coil with a non-magnetic core, the amount of magnetic flux, other than flux which is created by any current in the coil itself, linking that coil, and in the case of a coil with a magnetic core, the amount of magnetic flux, other than flux which is created by any current in the coil itself, which would link that coil in the absence of that magnetic core. With this terminology, it is clear that substantially none of the flux which excites the label coil 12 in FIG. 5 also links the coil in the interrogator antenna 9 in that figure.

The present invention may establish a surface current on the upper side of the metallic plate, on the lower side of which a surface current has been induced as a result of the creation in its vicinity of a magnetic field by an interrogator antenna.

Figure 6A:
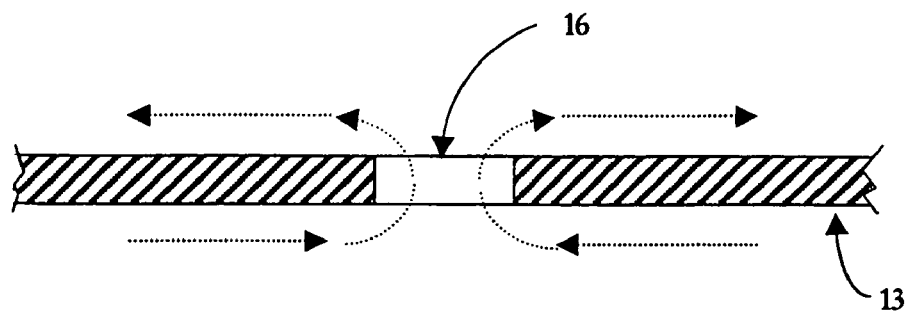
FIG. 6A shows one method of establishing surface currents.

One method by which this may be done is shown in FIG. 6A. In this figure an aperture which may preferably be in the form of a slot 16 which can be short in the horizontal direction but long in the direction perpendicular to the plane of the drawing has been provided in the metallic plate 13. Those currents on the under side of the metallic plate 13 which encounter the slot 16 flow through it and then along its upper surface.

Figure 6B:
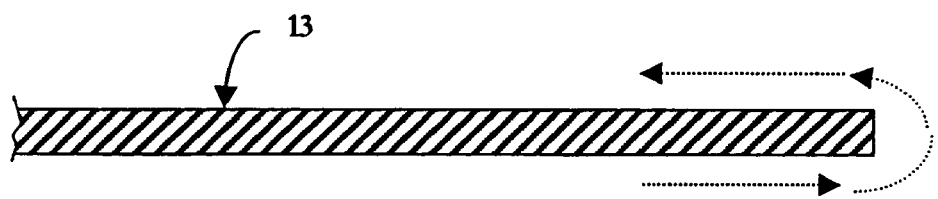
FIG. 6B shows another method of establishing surface currents.

In FIG. 6B an alternative method of creation of upper surface currents is shown. If the underside surface currents are created within a region sufficiently close to the end of the metallic plate 13 they will in encountering that end flow around it and will then flow in the opposite direction on the upper surface.

Figure 6C:
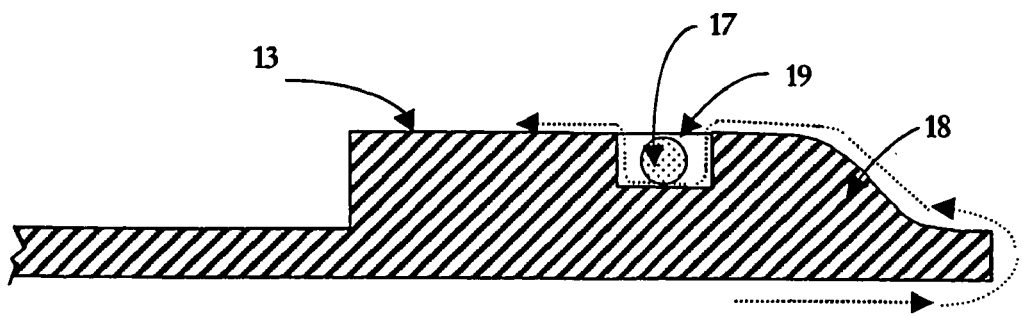
FIG. 6C shows a further method of establishing surface currents.

A further development of this principle is shown in FIG. 6C wherein the currents on the underside of the surface of the metallic plate 13 are shown as rounding the end and then following the contour of a thickened metallic section 18 and channel 19 within which the ferromagnetic rod 17 of a label receiving antenna 5 may be placed.

The surface currents on the three sides of the channel 19 adjacent to the ferromagnetic rod 17 of the label receiving antenna 5, in view of the principle labelled as Ampere's Law as modified by Maxwell, can be said to cause a magnetic field along the axis of the ferromagnetic rod 17, ie. directly into the page, and so provide excitation for the label 4.

In this implementation the length of the channel 19 in the direction perpendicular to the page should be significantly greater than the length of the ferromagnetic rod 17 used in the label receiving antenna 5 in that direction so that the flux emerging from the ends of the ferromagnetic rod 17 is not inhibited in completing its necessarily closed path through encountering too soon a metallic conductor whose face is perpendicular to the desired flux path.

According to another aspect of the invention the label receiving antenna 5 takes the form of a coil 12 on a ferromagnetic rod 17 placed in the channel 19 whose axis is orthogonal to the direction of currents induced on the top side of the metallic plate 13 which has an interrogator antenna 9 below the metallic plate 13, the extent of the channel 19 in the axial direction being significantly greater than the length of the ferromagnetic rod 17 of the label receiving antenna 5.

Figure 6D:
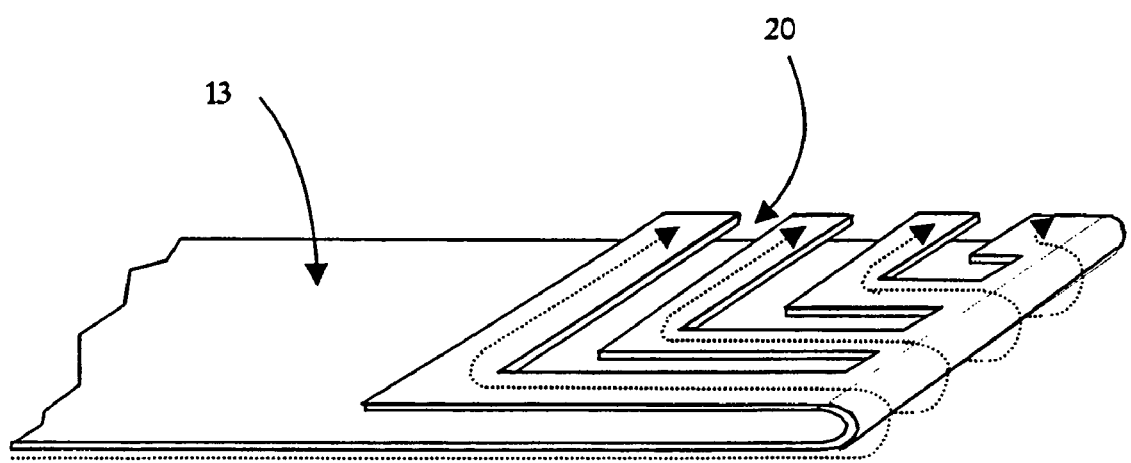
FIG. 6D shows a further method of establishing surface currents.

In another aspect of the present invention, shown in FIG. 6D it is made clear that the direction of the currents on the upper surface of the metallic object need not be the same as or opposite to the direction of the currents on the lower surface. In FIG. 6D is shown a metal plate 13, in which the top section is the folding back of the bottom section, and in which the top section has been furnished with a number of right angled shaped slits 20 to redirect the currents which were initially leftward into an orthogonal direction. The associated magnetic field induced by these currents will be everywhere orthogonal to them, and will in consequence change direction with the results that there is a region, wherein if an electronic label 4 is to be placed for maximum coupling, that label 4 should be rotated from the direction it should have if the slits 20 were not present.

As outlined in the disclosures referred to almost all electronic labelling systems employ a resonant circuit within the label 4 to enhance electromagnetic coupling.

It is important that electronic labels designed for operation in close proximity to metallic conductors should have their resonant frequencies adjusted for their intended environment and not for the case when the labels are in a free air environment.

Figure 7A:
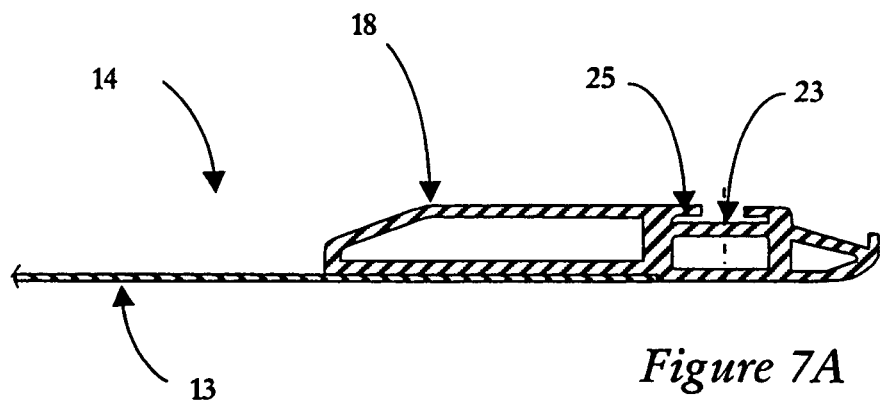
FIG. 7A shows a cross sectional view of a standard airline pallet.
Figure 7B:
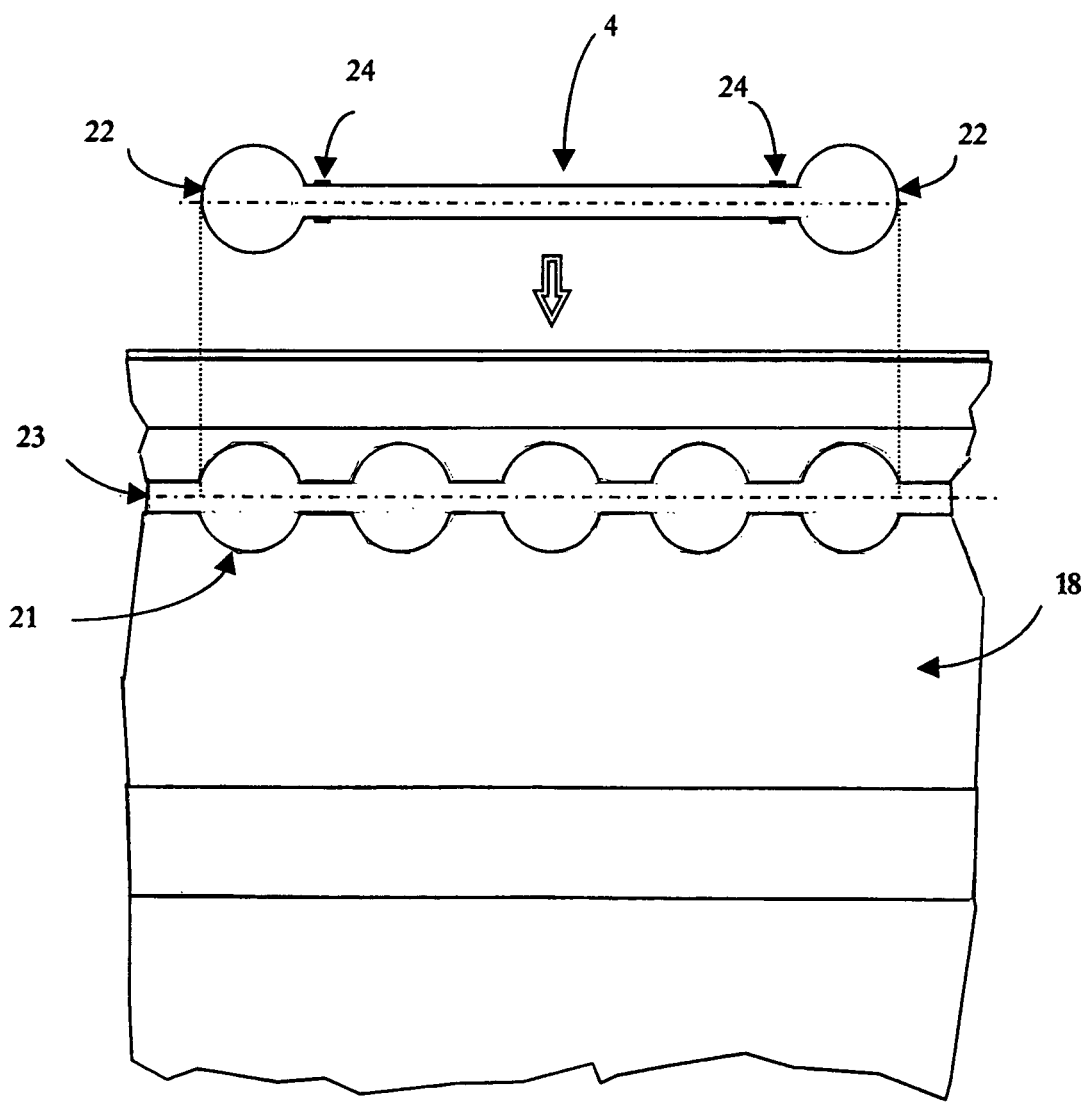
FIG. 7B shows a plan view of the airline pallet in FIG. 7A.

In the standard design of airline pallet 14, the edges of the metallic plate 13 are made in the form of an extruded section 18, the cross section of which is shown in FIG. 7A, into the upper surface of which is machined the series of round holes 21 shown in FIG. 7B. A simple installation of the label 4 as well as automatic locking in position of and protection against damage to the label 4 may be achieved by shaping the label 4 as shown in that figure. A feature of the label 4 shown here is that it contains a long thin ferromagnetic rod 17 which couples well to magnetic fields in the horizontal direction. Another feature is that the label 4 contains round locating lugs 22 which anchor it well within the machined slot 23 shown in plan view in FIG. 7B and in cross section view in FIG. 7A with which airline pallet edges are furnished for the purpose of facilitating locking down of the pallet 14 in flight.

Yet another feature is the installation at appropriate points on the electronic label 4 of plastic barbs 24 which allow the label 4, in a simple installation operation, to be pressed in to the slot 23 until the barbs 24 expand into the channel 25 below the upper surface of the metal, and lock the label 4 into place.

This design represents a further illustration of the mechanism for transferring current from the bottom side of the metallic plate 13 to its top side, such current being induced on the bottom side by the magnetic field of an interrogator antenna 9 in a direction towards an edge, so that the current on encountering that edge travels up it and back along the top side of the metallic plate 13.

Figure 8A:
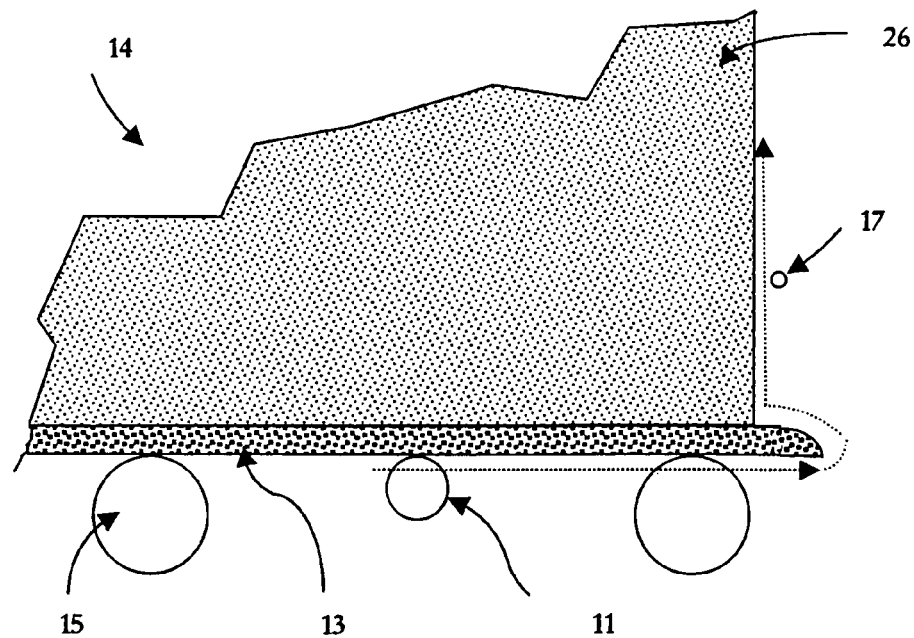
FIG. 8A shows a view of one section of the airline pallet in FIG. 7A.

The current having reached the top side of the metallic plate 13 can if required take a further change in direction shown in FIG. 8A. Here the label 4 is placed not on the top side of the metallic plate 13 but on the vertical section of the metallic structure 26 which is constructed above the top side of the metallic plate 13. The currents once reaching the top side of the metallic plate 13 can travel vertically upwards on the metallic structure 26 which acts as a conductor and induce magnetic fields which interact with the label 4.

In the system illustrated in FIG. 8A the rollers 15 on which the pallet 14 travels can be made with non-conducting surfaces so that current on the underside of the metallic plate 13 is not interrupted and so that there is thus an expanded range of pallet positions in relation to the rollers 15 at which label reading occurs.

It may be noted that although in lumped circuit theory conduction current flows in closed paths, it is not necessary to provide a return path for the conduction current which creates the magnetic field which excites the label 4.

Figure 8B:
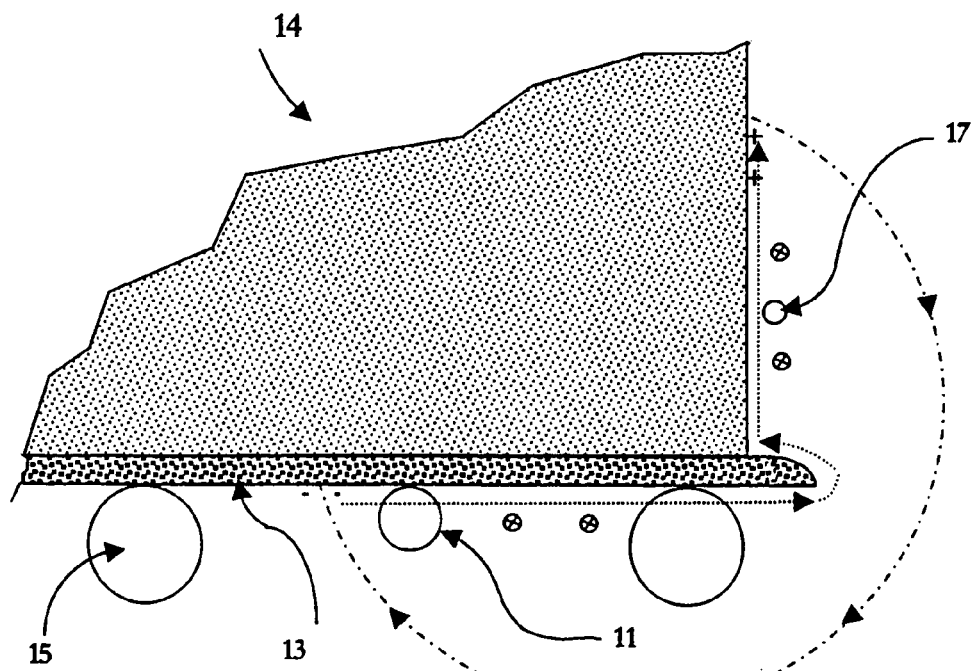
FIG. 8B shows direction of magnetic field lines associated with the airline pallet in FIG. 8A.

To explain this, FIG. 8B has been constructed to show as well as those things present in FIG. 8A the directions of the associated magnetic field lines associated with the surface currents on the object being identified. It can be seen from this figure that the time varying magnetic flux associated with those magnetic field lines, shown adjacent to and orthogonal to the surface currents in the region of the label 4, will as a consequence of the fundamental principle named above as Faraday's law induce a net potential around the dotted contour shown. As there can be no electric field within the horizontal metal base or the vertical metal body of the pallet 14, there will be an electric field roughly along the portions of that contour which are in air, and that electric field will terminate on oscillating surface electric charges shown in the figure as + and − signs on the metal. The oscillating surface change density will be supplied by the oscillating surface current, and will be responsible for a diminution in the amplitude of the oscillating surface current with distance from its source of excitation. The displacement current density associated with the above mentioned electric field provides a return path for the surface conduction current. It can be said that in the case of very long objects these surface charges play a part in establishing the coupling from the interrogator antenna 9 to the label receiving antenna 5.

It should be made clear that in this invention only a negligible proportion, if indeed there are any at all, of the flux lines which link the label antenna coil 12 are the same flux lines which link the interrogator antenna coil 27, which may be in the form of a solenoid 10. This fact that can be appreciated by studying FIG. 5 in relation to FIG. 2. In FIG. 2 we show flux lines which can link an interrogator antenna 9 and a label antenna coil 12 when the object being labelled is not present. These may be contrasted with the magnetic field, and hence, in air, the magnetic flux lines in the presence of the metallic plate 13 separating the interrogator antenna 9 and label antenna coil 12 shown in FIG. 5.

Figure 9A:
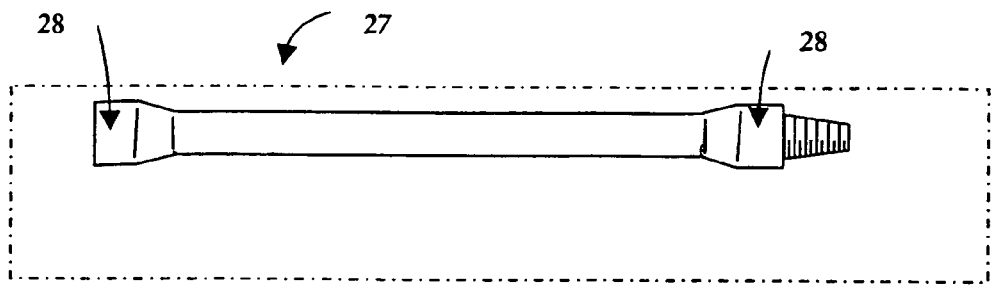
FIG. 9A shows drill string as used in the oil industry.
Figure 9B:
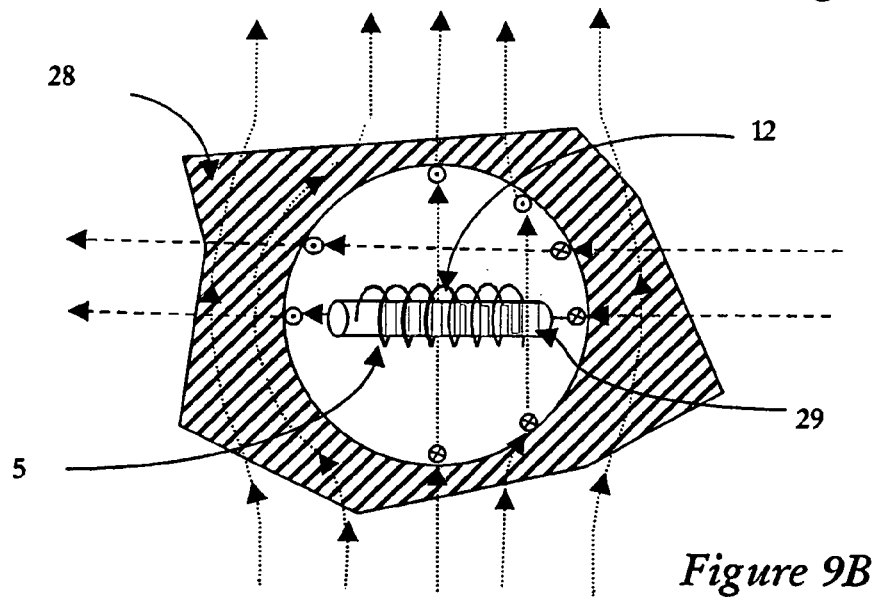
FIG. 9B shows a cross sectional view of the drill string in FIG. 9A and associated magnetic field lines.
Figure 9C:
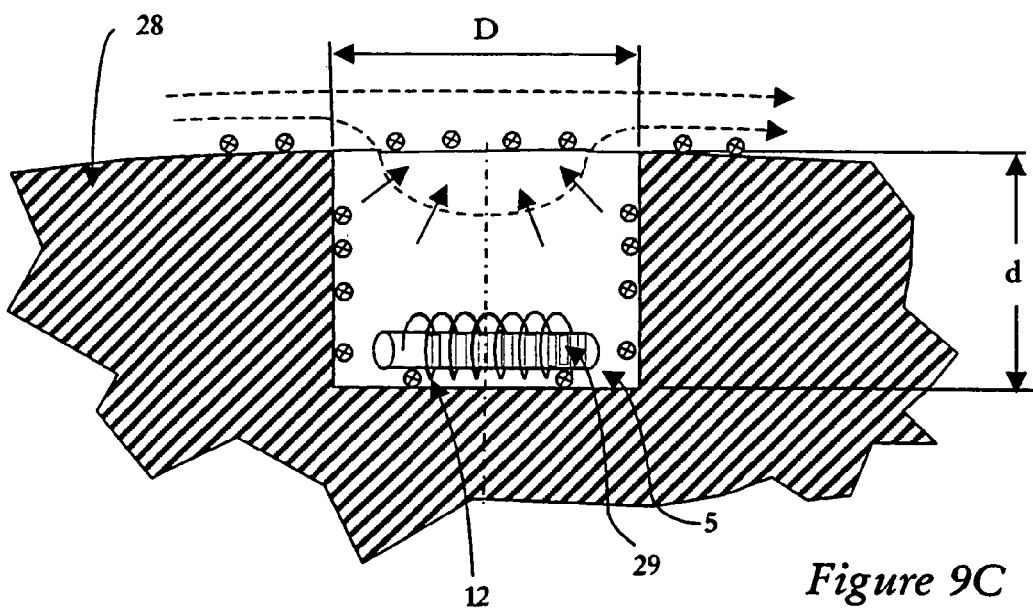
FIG. 9C shows another cross sectional view of the drill string in FIG. 9A and associated magnetic field lines.

Another situation where electronic labels must be operated in proximity with metal is illustrated in FIGS. 9A to 9D. Here a label 4 is intended to identify an element of a drilling string 27 in use in the oil industry and for that purpose the solid metal coupling 28 of the drill string 27 shown in FIG. 9A has as shown in FIGS. 9B and 9C had a round hole of diameter D and depth d bored into its surface, and at the bottom of that hole an electronic label 4 excited by a label receiving antenna 5 in the form of a coil 12 wound on a ferromagnetic core 29 has been placed. Both for mechanical protection of the label 4 and because the metal coupling 28 of the drill string 27 into which the hole has been bored shows considerable wear in service, the depth of the hole is considerable, perhaps 25 mm.

In this kind of application, because of the presence of water and mud on the outer surface of the coupling 28 between different sections of the drill string 27, microwave frequencies which might propagate down the hole just described cannot be used without excessive attenuation of the electromagnetic fields being caused by the named fluids, and frequencies in the LF to VHF region are more likely to be used. Although the magnetic field of such frequencies will create surface currents which will to an extent flow down the hole and support magnetic fields within the hole, it may be seen from regarding the hole as a circular and/or rectangular waveguide operating far below its cut off frequency, that such currents and fields will receive substantial attenuation at depth within the hole. The field and current lines shown in FIG. 9C are intended to echo this fact.

Figure 9D:
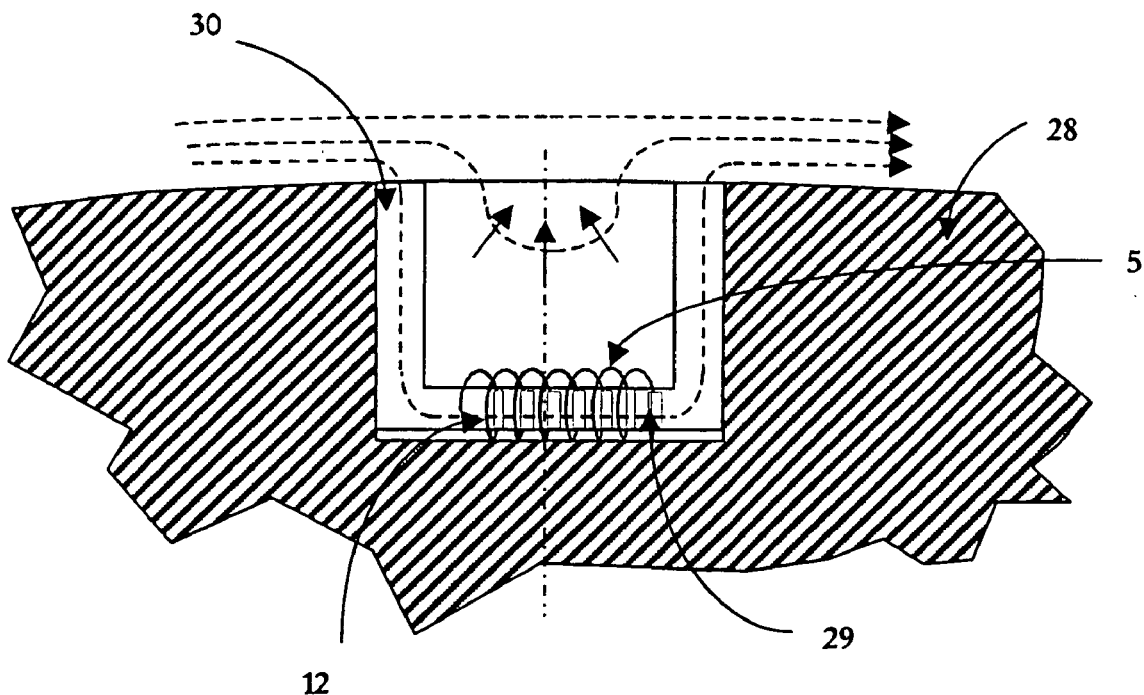
FIG. 9D shows another cross sectional view of the drill string in FIG. 9A and associated magnetic field lines.
Figure 9E:
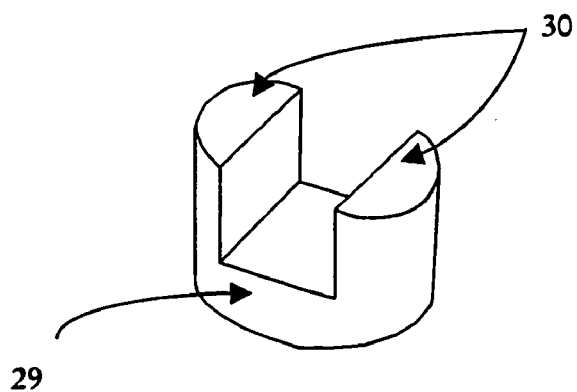
FIG. 9E shows a ferromagnetic core with legs.

According to an aspect of the present invention a solution to this problem is shown in FIGS. 9D and 9E. While the electronic label 4 and its ferromagnetic core 29 remain at the bottom of the hole, magnetic flux is encouraged to enter the hole by the installation of ferromagnetic legs 30 shown in FIG. 9D which extend from the ferromagnetic core 29 of the label antenna coil 12 upwards to meet the surface of the coupling 28. Although only a small magnetic field H is made to enter the hole, the corresponding magnetic flux density in the ferromagnetic section will be considerably greater than the value it would have if the ferromagnetic legs 30 were not present. The result is an enhancement of both the magnetic field H and magnetic flux density B in the horizontal section of the label receiving antenna 5, with a corresponding enhancement in the wall currents at the bottom of the hole which accompany the enhanced tangential value of the magnetic field.

As has been mentioned before, coupling to the label 4 is enhanced through the use of a resonant circuit within the label 4 and involving the label receiving antenna 5. In this case the resonant frequency is naturally dependent upon the inductance of the label receiving antenna 5 which in turn depends upon the length of the ferromagnetic legs 30 extending upwards to the surface of the coupling. Because of the previously mentioned in-service wear of the coupling 28 the length of those legs 30, which are subject to wear at the same time as the surface of the coupling 28 itself is subject to wear, diminishes in service. In consequence it is appropriate to position the resonant frequency, before wear takes place, of the label receiving antenna 5 to be somewhat below the frequency of the interrogation signal so that as the wear takes place and the legs are shortened and the resonant frequency of the label receiving antenna 5 rises, the coupling 28 will be first enhanced as the resonant frequency moves towards synchronism with the interrogation frequency and then will diminish again as further wear brings the resonant frequency of the label receiving antenna 5 to the high side of the interrogation frequency. In this way an optimum variation of strength of coupling 28 with respect to inservice wear may be achieved, and the sensitivity of the label 4 optimised over its service life.

In another aspect of the invention steps may be taken to preserve as far as possible the continued passage of magnetic field and wall current down the hole without that current suffering diminution through the need to provide a surface charge density on the walls to support an electric flux density which will flow from one wall to another in the space between the ferromagnetic legs as a consequence of Faraday's Law and the existence of a changing magnetic flux within those legs. To minimise the electric flux passing between the walls while still providing protection for the tag circuit, the space within the hole not occupied by the tag circuit or ferromagnetic legs may be filled with a strong dielectric material of low dielectric constant, perhaps of a honeycomb structure.

Figure 10A:
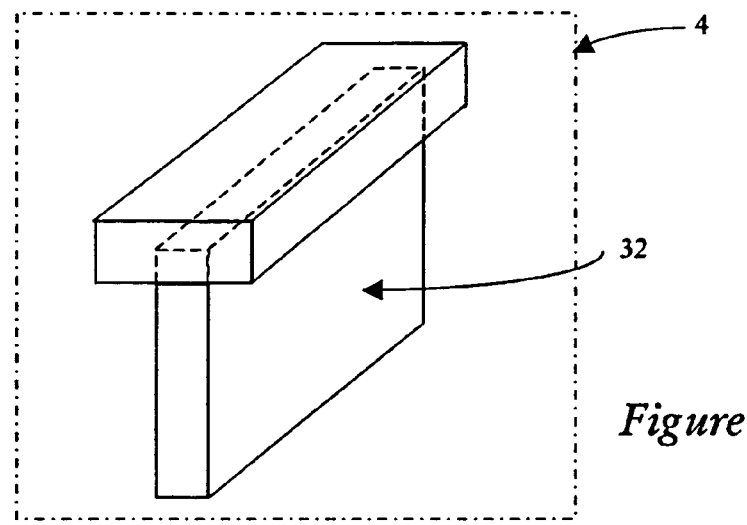
FIG. 10A shows an electronic label retaining structure formed with a rectangular metallic tube.
Figure 10B:
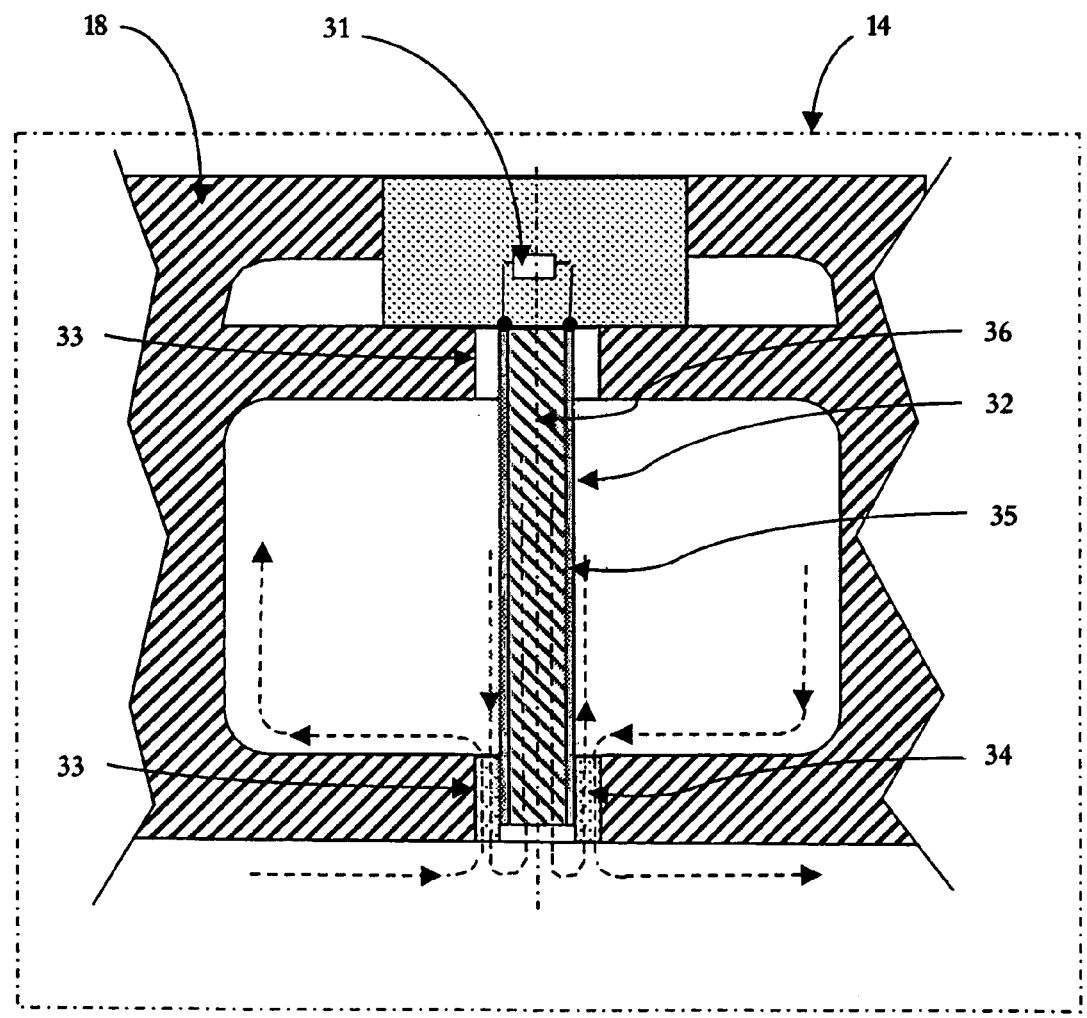
FIG. 10B shows a cross-sectional view of an airline pallet receiving the label retaining structure.

Yet another embodiment of the present invention, suitable for use when the interrogation frequencies are much higher than those which are appropriate for use with the structures discussed up to the present point, is shown in FIGS. 10A and 10B. This embodiment is also suitable for use with metallic airline pallet plate 13 and can make use of some aspects of the slotted extrusion 18, already shown in FIG. 7A used in the construction of the edges of such pallets 14.

In this embodiment the label 4 is shaped externally roughly as shown in FIG. 10A and is fitted within the airline pallet 14 in a way illustrated in FIG. 10B.

In this embodiment the label circuit 31 is in the upper section of the structure shown in FIG. 10A. That section is given protection by installing it within the slotted section 23 of the edge of the pallet 14, the form of which has been shown in FIGS. 7A and 7B. The label circuit 31 communicates with electromagnetic fields below the pallet 14 and surface currents on the under side of the pallet 14 via a hollow rectangular metal tube 32 which as shown in FIG. 10B passes through a rectangular slot 33 machined into the edge extrusion 18 of the pallet 14. The rectangular metal tube 32 may connect with the machined slot 33 in the pallet 14 or may be separated therefrom by a thin dielectric layer 34.

The rectangular metal tube 32 may be open at the top and may have the electronic label circuit 31 connected between two opposite faces of the rectangular tube 32 or may be closed at the top with the label connected between opposite faces 35 at a point some distance from the closed end.

The diagram shows the distribution of current in the base of the pallet 14 as a result of its illumination by an electromagnetic field. That current may directly enter the inside of the rectangular metallic tube 32 if a connection is made at is lower end, or may reach the outer surface of the rectangular metallic tube 32 via the capacitance across the thin dielectric layer 34, or may reach the outside of the rectangular metallic tube 32 as a displacement current distributed over its length, so as to create on the outside of the rectangular metallic tube 32 a downward surface conduction current which eventually enters the interior of the rectangular metallic tube 32.

The rectangular metallic tube 32 may be filled with dielectric material 36 both for the protection of the label circuit 31 and for enhancement of electromagnetic propagation. The rectangular metallic tube 32 may act at the frequency of interrogation as a waveguide either above or below its cut off frequency.

Provided the distance between the aperture at the bottom of the rectangular metallic tube 32 and the location of the label circuit 31 is sufficiently short, the rectangular metallic tube 32 can act as an impedance transformer whether or not the electromagnetic field modes within it are evanescent or propagating, and can transform the impedance of the electronic label circuit 31, either in the situation when the rectangular magnetic tube 32 outer wall contacts the rectangular slot 33 in the underside of the pallet 14 or in the situation when it does not, to accomplish a conjugate impedance match between the label impedance and the radiation impedance of the aperture as seen from the connection point to the label circuit 31. As frictional contacts at microwave frequencies can be unreliable, the absence of contact between the rectangular metallic tube and the slot in the underside of the pallet 14 is the preferred mode of operation. Of course the use of a rectangular tube is a matter of convenience in description, and other shapes permitting electromagnetic fields in their interiors may be employed.

It will be appreciated that various alterations, modifications and/or additions may be introduced into the constructions and arrangements of parts previously described without departing from the spirit or ambit of the present invention.

What is claimed is:

1. An electronic label reading system including:
    at least one information bearing electronic coded label including a label antenna;
    an interrogator including an interrogator antenna;
    a magnetic field coupling link containing a transmitter coil and a receiver coil for communication between the interrogator and the label;
    wherein the coupling link is arranged such that it operates in the near field of said transmitter coil and wherein substantially none or at most a minority of the magnetic flux which excites said receiver coil also links said transmitter coil.

2. An electronic label reading system as claimed in claim 1 wherein said interrogator includes said transmitter coil and said label includes said receiver coil.

3. An electronic label reading system as claimed in claim 1 wherein said label includes said transmitter coil and said interrogator includes said receiver coil.

4. An electronic label reading system as claimed in claim 3 wherein said label is placed in a slot in the metal object.

5. An electronic label reading system as claimed in claim 4 wherein the length of said slot, in the direction perpendicular to the path of currents in the region of the slot, is significantly greater than the length of the label coil or its ferrite core in that direction.

6. An electronic label reading system as claimed in claim 4 wherein the whole of said label is inside the main outline of said metal object.

7. An electronic label reading system as claimed in claim 4 wherein the object being labelled is an airline cargo pallet, and said label is locked in position by employing slots already made in said pallet for the purpose of cargo lock down.

8. An electronic label reading system as claimed in claim 7 wherein barbs on said label lock it in place in a re-entrant slot in the pallet.

9. An electronic label reading system as claimed in claim 7 wherein an interrogator antenna is placed parallel to and between rollers of a conveyor system.

10. An electronic label reading system as claimed in claim 9 wherein the rollers have a non-conducting surface or non-conducting bearings.

11. An electronic label reading system as claimed in claim 3 wherein the label coil is resonant in its operating frequency band.

12. An electronic label reading system as claimed in claim 11 wherein the resonant frequency is adjusted for proximity of the label to the metal of the object carrying the label.

13. An electronic label reading system as claimed in claim 1 wherein said transmitter or receiver coil contains a magnetic core.

14. An electronic label reading system as in claim 1 wherein said label antenna operated in proximity to a metal object and the metal object provides substantial reduction of the amount of magnetic field that would reach the receiver coil from the transmitter coil in relation to the magnetic field which would reach said receiver coil if the metal object were not present.

15. An electronic label reading system as claimed in claim 14 coil wherein the label coil is excited by a magnetic field created by surface currents on metal of an object carrying said label.

16. An electronic label reading system as claimed in claim 14 wherein currents are induced on one side of the metal object by said magnetic field, and wherein a pathway on said metal object allows those currents to pass to the other side of said metal object, and wherein said label is placed close to the currents on said other side of said metal object so that said label interacts with the magnetic field which accompanies said currents on said other side of said metal object.

17. An electronic label reading system as claimed in claim 16 wherein said pathway is provided by holes in said metal object.

18. An electronic label reading system as claimed in claim 17 wherein currents change direction when they reach said other side of said metal object.

19. An electronic label reading system as claimed in claim 17 wherein edges of the holes in said metal are perpendicular to the direction of said induced current.

20. An electronic label reading system as claimed in claim 17 wherein said holes are extended in the direction of a magnetic field created by said magnetic field creating antenna.

21. An electronic label reading system as claimed in claim 17 wherein said holes are a natural part of said object.

22. An electronic label reading system as claimed in claim 17 wherein said holes are added to said object.

23. An electronic label reading system as claimed in claim 16 wherein said currents induced on one side of said metal object travel toward an edge of said metal object.

24. An electronic label reading system as claimed in claim 16 wherein conduction current on said metal object does not flow in closed paths.

25. An electronic label reading system as claimed in claim 24 wherein the path of currents which flow on said metal object is completed by a displacement current.

26. An electronic label reading system as claimed in claim 1 wherein said coupling link is used for signaling from the interrogator to the label.

27. An electronic label reading system as claimed in claim 26 wherein the label may be read while a sheet of metal is interposed between the interrogator and the label.

28. An electronic label reading system as claimed in claim 27 wherein said sheet of metal is of substantial extent.

29. An electronic label reading system as claimed in claim 27 coil wherein the transmitter and receiver coils have parallel axes.

30. An electronic label reading system as claimed in claim 1 wherein said coupling link is used for signaling from the label to the interrogator.

31. An electronic label reading system as claimed in claim 1 wherein the interrogator provides power to the label to generate a reply from the label.

32. An electronic label reading system as claimed in claim 1 wherein the label generates replies intermittently.

33. An electronic label reading system as claimed in claim 32 wherein power for the label comes from power supplied by the transmitter during the period of the label giving a reply.

34. An electronic label reading system as claimed in claim 1 wherein said interrogator transmitter-receiver antenna comprises two separate antennas, one for transmission (3) and another for receiving (6), and said label transmitter-receiver antenna comprises a single antenna (5).

35. A method of obtaining information from an electronic label in proximity to a metal object, said label containing a label antenna, said method including the steps of:
   providing an interrogator containing an interrogator antenna;
   providing a magnetic field coupling link containing a transmitter coil and a receiver coil for communication between the interrogator and the label; and
   arranging said coupling link such that it operates in the near field of said transmitter coil and wherein substantially none or at most a minority of the magnetic flux which excites said receiver coil also links said transmitter coil.

36. A method as claimed in claim 35 wherein said interrogator includes said transmitter coil and said label includes said receiver coil.

37. A method as claimed in claim 35 wherein said label includes said transmitter coil and said interrogator includes said receiver coil.

38. An electronic label reading system comprising,
   an electronic coded label (4) having an antenna coil (12) and at least one item of information, said label being in proximity to a metal object (13),
   an interrogator (1) including a transmitter coil (3) and a receiver coil (6),
   said metal object substantially screening said label from the interrogator (1), and
   said metal object (13) further includes a pathway on it to allow surface currents induced by the interrogator on one side of said metal object to pass to the other side and to create a magnetic field (13C) exciting the label antenna coil (12).

39. A method of obtaining information from an electronic label in proximity to a metal object that substantially screens the label from an interrogator (1) containing a transmitter coil (3) and a receiver coil (6) comprising the steps of:
   producing induced surface currents (13A) on one side of the metal object by a magnetic field of the interrogator,
   defining a pathway on said metal object (13) to allow the surface currents induced by the interrogator on one side of said metal object to pass to the other side and to create a magnetic field (13C) exciting the label antenna coil (12).

* * * * *

UNITED STATES PATENT AND TRADEMARK OFFICE
CERTIFICATE OF CORRECTION

PATENT NO. : 6,956,481 B1
DATED : October 18, 2005
INVENTOR(S) : Peter Cole

It is certified that error appears in the above-identified patent and that said Letters Patent is hereby corrected as shown below:

Title page,
Item [73], Assignee, change "Germplus" to -- Gemplus --.

Signed and Sealed this

Tenth Day of January, 2006

JON W. DUDAS
*Director of the United States Patent and Trademark Office*